US012590237B2

(12) United States Patent
Kamiya

(10) Patent No.: US 12,590,237 B2
(45) Date of Patent: Mar. 31, 2026

(54) THERMALLY CONDUCTIVE COMPOSITION, THERMALLY CONDUCTIVE SHEET OBTAINED FROM SAME, AND PRODUCTION METHOD THEREFOR

(71) Applicant: Fuji Polymer Industries Co., Ltd., Nagoya (JP)

(72) Inventor: Yuki Kamiya, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 237 days.

(21) Appl. No.: 18/697,351

(22) PCT Filed: Sep. 5, 2022

(86) PCT No.: PCT/JP2022/033235

§ 371 (c)(1),
(2) Date: Mar. 29, 2024

(87) PCT Pub. No.: WO2023/135857

PCT Pub. Date: Jul. 20, 2023

(65) Prior Publication Data

US 2024/0409799 A1 Dec. 12, 2024

(30) Foreign Application Priority Data

Jan. 14, 2022 (JP) ................................ 2022-004460

(51) Int. Cl.
*C09K 5/14* (2006.01)
*C08J 5/18* (2006.01)
(Continued)

(52) U.S. Cl.
CPC .................. *C09K 5/14* (2013.01); *C08J 5/18* (2013.01); *C08K 13/04* (2013.01);
(Continued)

(58) Field of Classification Search
CPC ........ C08G 77/00; C08G 77/04; C08G 77/14; C08G 77/16; C08G 77/18; C08G 77/20;
(Continued)

(56) References Cited

U.S. PATENT DOCUMENTS

2011/0009544 A1 1/2011 Funahashi
2019/0292321 A1 9/2019 Appukuttan et al.
(Continued)

FOREIGN PATENT DOCUMENTS

JP 2013-147600 8/2013
JP 2016-216523 12/2016
(Continued)

OTHER PUBLICATIONS

International Search Report issued in International Application No. PCT/JP2022/033235, Oct. 11, 2022, 5 pages w/ translation.
(Continued)

*Primary Examiner* — Zachary M Davis
(74) *Attorney, Agent, or Firm* — HSML P.C.

(57) ABSTRACT

Provided is a thermally conductive composition that contains a matrix resin made of a thermosetting resin, a curing catalyst, and thermally conductive particles. The thermally conductive particles include the following (a) to (c) with respect to 100 parts by mass of the matrix resin: (a) 600 to 1500 parts by mass of spherical alumina with an average particle size of more than 100 μm; (b) 100 to 400 parts by mass of alumina with an average particle size of 1 μm or less; and (c) 500 to 1500 parts by mass of aluminum nitride with an average particle size of 0.8 to 150 μm. A degree of plasticity of the thermally conductive composition after defoaming and before curing is 80 or less. With this configuration, the thermally conductive composition maintains a high thermal conductivity after curing and has a low degree of plasticity and good moldability. Further provided
(Continued)

is a thermally conductive sheet formed using the thermally conductive composition and a method for producing the thermally conductive-sheet.

9 Claims, 3 Drawing Sheets

(51) Int. Cl.

| | |
|---|---|
| ***C08K 13/04*** | (2006.01) |
| *C08K 3/22* | (2006.01) |
| *C08K 3/28* | (2006.01) |
| *C08K 7/18* | (2006.01) |

(52) U.S. Cl.
CPC ... *C08J 2383/05* (2013.01); *C08K 2003/2227* (2013.01); *C08K 2003/282* (2013.01); *C08K 7/18* (2013.01); *C08K 2201/001* (2013.01); *C08K 2201/005* (2013.01)

(58) Field of Classification Search
CPC ........ C08G 77/22; C08G 77/48; C08K 13/04; C08K 2003/2227; C09K 5/14
See application file for complete search history.

(56) References Cited

U.S. PATENT DOCUMENTS

| | | | | |
|---|---|---|---|---|
| 2021/0017437 | A1 | 1/2021 | Suzumura | |
| 2022/0081531 | A1 | 3/2022 | Sasaki et al. | |
| 2023/0227708 | A1 * | 7/2023 | Hironaka | C08K 13/04 252/75 |
| 2024/0279525 | A1 * | 8/2024 | Zheng | H05K 7/2039 |

FOREIGN PATENT DOCUMENTS

| | | |
|---|---|---|
| JP | 2018-021156 | 2/2018 |
| JP | 2021-518466 | 8/2021 |
| KR | 10-2021-0121023 | 10/2021 |
| WO | 2009/136542 | 11/2009 |
| WO | 2018-088416 | 5/2018 |
| WO | 2020/137086 | 4/2020 |
| WO | 2020-137970 | 7/2020 |

OTHER PUBLICATIONS

Office Action issued in corresponding Korean Patent Application No. 10-2024-7018532, Jan. 9, 2026, 16 pages w/translation.

* cited by examiner

THERMALLY CONDUCTIVE COMPOSITION, THERMALLY CONDUCTIVE SHEET OBTAINED FROM SAME, AND PRODUCTION METHOD THEREFOR

TECHNICAL FIELD

The present invention relates to a thermally conductive composition that is suitable to be interposed between a heat generating member and a heat dissipator of electrical and electronic components or the like, a thermally conductive sheet formed using the thermally conductive composition, and a method for producing the thermally conductive sheet.

BACKGROUND ART

With the significant improvement in the performance of semiconductor devices such as CPUs in recent years, the amount of heat generated by them has become extremely large. For this reason, heat dissipators are attached to electronic components that may generate heat, and a thermally conductive sheet is used to improve the adhesion between the heat dissipators and semiconductor devices. There is a need for the thermally conductive sheet to have flexibility and high thermal conductive properties as devices become smaller in size, more sophisticated, and more highly integrated. For example, Patent Documents 1 to 4 propose conventional thermally conductive sheets.

PRIOR ART DOCUMENTS

Patent Documents

Patent Document 1: JP 2021-518466 A
Patent Document 2: WO 2020-137970 A1
Patent Document 3: WO 2018-088416 A1
Patent Document 4: JP 2016-216523 A

DISCLOSURE OF INVENTION

Problem to be Solved by the Invention

In the conventional thermally conductive composition and the conventional thermally conductive sheet obtained from the same, the higher the thermal conductivity, the higher the degree of plasticity and the lower the moldability of the composition.

To solve these problems, the present invention provides a thermally conductive composition that maintains a high thermal conductivity after curing and has a low degree of plasticity and good moldability, a thermally conductive sheet formed using the thermally conductive composition, and a method for producing the thermally conductive sheet.

Means for Solving Problem

A thermally conductive composition of the present invention comprises a matrix resin made of a thermosetting resin, a curing catalyst, and thermally conductive particles. The thermally conductive particles include the following (a) to (c) with respect to 100 parts by mass of the matrix resin:

(a) 600 to 1500 parts by mass of spherical alumina with an average particle size of more than 100 μm;
(b) 100 to 400 parts by mass of alumina with an average particle size of 1 μm or less; and
(c) 500 to 1500 parts by mass of aluminum nitride with an average particle size of 0.8 to 150 μm.

A degree of plasticity of the thermally conductive composition after defoaming and before curing is 80 or less.

A thermally conductive sheet of the present invention includes the thermally conductive composition that has been molded into a sheet.

A method for producing a thermally conductive sheet of the present invention includes the following: vacuum defoaming the thermally conductive composition; rolling and molding the defoamed composition into a sheet; and then heating and curing the sheet.

Effects of the Invention

With the above configuration, the present invention can provide a thermally conductive composition that maintains a high thermal conductivity after curing and has a low degree of plasticity and good moldability, and can also provide a thermally conductive sheet formed using the thermally conductive composition. Specifically, the degree of plasticity of the thermally conductive composition after defoaming and before curing is 80 or less, and a preferred thermal conductivity is 7.3 W/m·K or more. The method for producing a thermally conductive sheet of the present invention uses the thermally conductive composition that has a low degree of plasticity and good moldability, and thus can form a continuous sheet.

DESCRIPTION OF THE INVENTION

Figure 1:
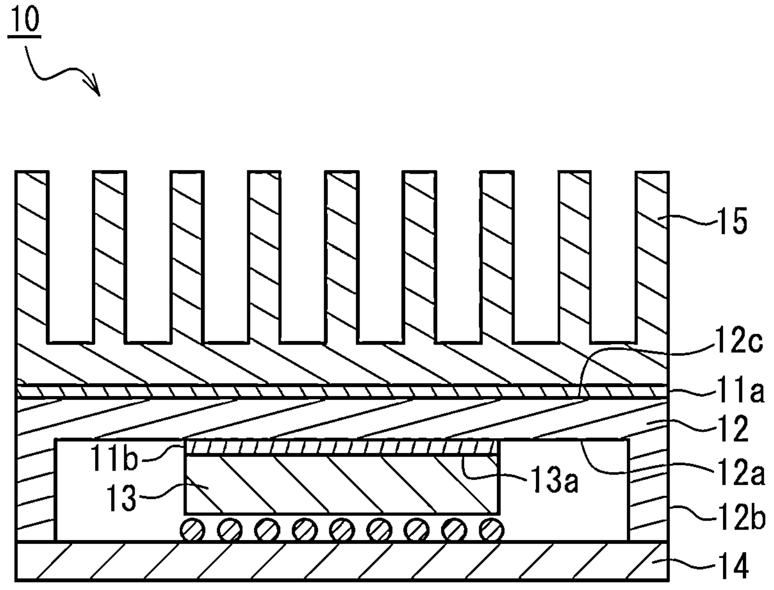
FIG. 1 is a schematic cross-sectional view illustrating a method for using a thermally conductive sheet in an embodiment of the present invention.

The present invention relates to a thermally conductive composition that comprises a matrix resin, a curing catalyst, and thermally conductive particles. The matrix resin is preferably a thermosetting resin such as silicone rubber, silicone gel, acrylic rubber, fluorocarbon rubber, epoxy resin, phenol resin, unsaturated polyester resin, melamine resin, acrylic resin, silicone resin, or fluorocarbon resin. In particular, silicone is preferred, and the silicone may be in the form of an elastomer, gel, putty, or grease. The silicone may be cured by any method, such as using a peroxide, addition, or condensation curing system. The silicone is suitable because of its high heat resistance. Moreover, the silicone is preferably an addition reaction type, since the addition reaction silicone is not corrosive to the surroundings, allows only a small amount of by-product to be released to the outside of the system, and ensures deep curing properties.

The thermally conductive particles are added with respect to 100 parts by mass of the matrix resin component in the following manner.

(a) The amount of spherical alumina with an average particle size of more than 100 μm is 600 to 1500 parts by mass, and preferably 600 to 1400 parts by mass. The average particle size of the spherical alumina is preferably more than 100 μm and 150 μm or less, more preferably 102 to 140 μm, and further preferably 104 to 130 μm.

(b) The amount of alumina with an average particle size of 1 μm or less is 100 to 400 parts by mass, and preferably 150 to 350 parts by mass. The average particle size of the alumina is preferably 0.05 to 1 μm, and more preferably 0.1 to 0.9 μm. The alumina may be in the form of spherical particles or irregularly-shaped crushed particles (also referred to as "irregularly-shaped" particles in the following).

(c) The amount of aluminum nitride with an average particle size of 0.8 to 150 μm is 500 to 1500 parts by mass, preferably 600 to 1400 parts by mass, and more preferably 700 to 1400 parts by mass. The average particle size of the aluminum nitride is preferably 0.8 to 140 μm, more preferably 0.8 to 130 μm, and further preferably 0.9 to 120 μm. The aluminum nitride is preferably in the form of irregularly-shaped crushed particles.

The degree of plasticity of the thermally conductive composition after vacuum defoaming and before curing is 80 or less, preferably 1 to 80, and more preferably 5 to 70. Thus, the thermally conductive composition can have a low degree of plasticity and good moldability. The degree of plasticity is determined in accordance with JIS K 6300-3 and ISO 2007:1991. Using a Wallace plastometer, a sample is compressed between two metal plates under a predetermined load (100 N) for a predetermined time (15 sec) at a measurement temperature of 25° C. The degree of plasticity ($P_0=t/t_0\times100$) is calculated by dividing the thickness (t) of the sample after the compression by the thickness ($t_0$) of the sample before the compression. The smaller the value $P_0$, the more flexible the sample.

A cured product of the thermally conductive composition has a thermal conductivity of preferably 7.3 W/m·K or more, more preferably 7.3 to 20 W/m·K, further preferably 7.5 to 17 W/m·K, and particularly preferably 8 to 15 W/m·K. Thus, the cured product of the thermally conductive composition can have a high thermal conductivity and is suitable as a TIM (thermal interface material).

The cured product of the thermally conductive composition has an ASKER C hardness of preferably 50 or less, more preferably 10 to 50, and further preferably 15 to 45. Thus, the cured product of the thermally conductive composition can have good followability to a heat generator and a heat dissipator (heat sink).

A silane coupling agent is further added, preferably in an amount of 0.1 to 10 parts by mass, and more preferably in an amount of 0.5 to 7 parts by mass with respect to 100 parts by mass of the matrix resin component. The surface of the thermally conductive particles is covered with the silane coupling agent (surface treatment). The surface treatment facilitates the filling of the matrix resin with the thermally conductive particles and prevents the adsorption of the curing catalyst on the thermally conductive particles, thereby preventing curing inhibition. This is useful for storage stability. The silane coupling agent is a silane compound or its partial hydrolysate. The silane compound is expressed by $R(CH_3)_aSi(OR')_{4-a}$, where R represents a substituted or unsubstituted organic group having 1 to 20 carbon atoms, R' represents an alkyl group having 1 to 4 carbon atoms, and a represents 0 or 1. Examples of an alkoxysilane compound (simply referred to as "silane" in the following) that is expressed by $R(CH_3)_aSi(OR')_{4-a}$, where R represents a substituted or unsubstituted organic group having 1 to 20 carbon atoms, R' represents an alkyl group having 1 to 4 carbon atoms, and a represents 0 or 1, include silane compounds such as methyltrimethoxysilane, ethyltrimethoxysilane, propyltrimethoxysilane, butyltrimethoxysilane, pentyltrimethoxysilane, hexyltrimethoxysilane, hexyltriethoxysilane, octyltrimethoxysilane, octyltriethoxysilane, decyltrimethoxysilane, decyltriethoxysilane, dodecyltrimethoxysilane, dodecyltriethoxysilane, hexadecyltrimethoxysilane, hexadecyltriethoxysilane, octadecyltrimethoxysilane, and octadecyltriethoxysilane. These silane compounds may be used alone or in combination of two or more.

Figure 3:
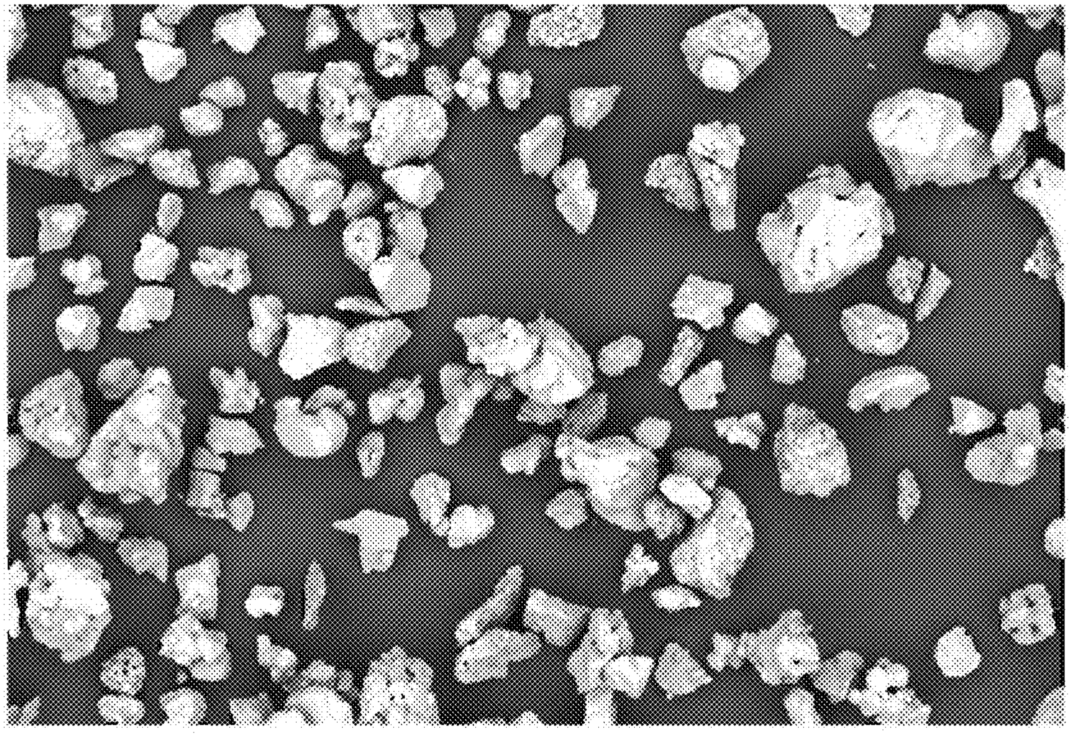
FIG. 3 is a micrograph (100× magnification) showing the appearance of irregularly-shaped crushed aluminum nitride used in an embodiment of the present invention.

The aluminum nitride, as described in (c) above, is preferably in the form of irregularly-shaped crushed particles. The irregularly-shaped crushed aluminum nitride is readily available. FIG. 3 is a micrograph (100× magnification) showing the appearance of irregularly-shaped crushed aluminum nitride used in an embodiment of the present invention.

The thermally conductive composition of the present invention is molded into a sheet, which is a thermally conductive sheet. The thermally conductive sheet is very versatile and suitable as a TIM. The thickness of the thermally conductive sheet is preferably 0.2 to 10 mm.

The thermally conductive sheet of the present invention is produced by vacuum defoaming of the thermally conductive composition, rolling and molding the defoamed composition into a sheet, and then heating and curing the sheet. In the vacuum defoaming, the thermally conductive composition (compound) is defoamed under a reduced pressure of −0.08 to −0.1 Pa for about 5 to 10 minutes. The compound may be rolled, e.g., by rotating rolls or by pressing. In this case, the rolling process with rotating rolls is preferred because it enables continuous production.

A dielectric breakdown voltage (JIS K 6249) of the thermally conductive composition is preferably 7 to 16 kV/mm. Thus, a thermally conductive sheet with high electrical insulation properties can be obtained.

A volume resistivity (JIS K 6249) of the thermally conductive composition is preferably $10^{10}$ to $10^{14}$ Ω·cm. Thus, a thermally conductive sheet with high electrical insulation properties can be obtained.

An example of the present invention may be an addition reaction silicone composition (uncured composition), and preferably a compound with the following composition.

A. Matrix Resin Component

The matrix resin component contains the following components A1 and A2. The components A1 and A2 add up to 100 parts by mass.

A1: a linear organopolysiloxane having at least two silicon-bonded alkenyl groups per molecule.

A2: an organohydrogenpolysiloxane having at least two silicon-bonded hydrogen atoms per molecule, which serves as a crosslinking component. The number of moles of the organohydrogenpolysiloxane is less than 1 mole with respect to 1 mole of the silicon-bonded alkenyl groups contained in the component A1.

The matrix resin component may further contain an organopolysiloxane having no reactive group in addition to the components A1 and A2.

B. Thermally Conductive Particles

The thermally conductive particles include the following with respect to 100 parts by mass of the matrix resin:

(a) 600 to 1500 parts by mass of spherical alumina with an average particle size of more than 100 μm;

(b) 100 to 400 parts by mass of alumina with an average particle size of 1 μm or less; and (c) 500 to 1500 parts by mass of aluminum nitride with an average particle size of 0.8 to 150 μm.

C. Platinum-based metal catalyst added in an amount of 0.01 to 1000 ppm by mass with respect to the matrix resin component.

D. Other additives include any amount of a curing retarder, a coloring agent, or the like and a silane coupling agent.

Hereinafter, each component will be described.

(1) Base Polymer Component (Component A1)

The base polymer component is an organopolysiloxane containing two or more alkenyl groups bonded to silicon atoms per molecule. The organopolysiloxane containing two or more alkenyl groups is the base resin (base polymer component) of a silicone rubber composition of the present invention. In this case, the organopolysiloxane has two silicon-bonded alkenyl groups per molecule. The alkenyl group has 2 to 8 carbon atoms, and particularly 2 to 6 carbon atoms and can be, e.g., a vinyl group or an allyl group. The viscosity of the organopolysiloxane is preferably 10 to 1000000 mPa·s, and more preferably 100 to 100000 mPa·s at 25° C. in terms of workability and curability.

Specifically, an organopolysiloxane represented by the following general formula (Chemical Formula 1) is used. This organopolysiloxane contains two or more alkenyl groups per molecule, in which the alkenyl groups are bonded to silicon atoms at both ends of the molecular chain. The organopolysiloxane is a linear organopolysiloxane whose side chains are capped with alkyl groups. The viscosity of the organopolysiloxane is preferably 10 to 1000000 mPa·s at 25° C. in terms of workability and curability. Moreover, the linear organopolysiloxane may include a small amount of branched structure (trifunctional siloxane units) in the molecular chain.

[Chemical Formula 1]

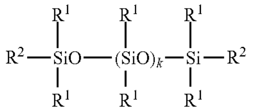

In the formula, $R^1$ represents substituted or unsubstituted monovalent hydrocarbon groups that are the same as or different from each other and have no aliphatic unsaturated bond, $R^2$ represents alkenyl groups, and k represents 0 or a positive integer. The monovalent hydrocarbon group represented by $R^1$ has, e.g., 1 to 10 carbon atoms, and particularly preferably 1 to 6 carbon atoms. Specific examples of the monovalent hydrocarbon group include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups. The alkenyl group represented by $R^2$ has, e.g., 2 to 6 carbon atoms, and particularly preferably 2 to 3 carbon atoms. Specific examples of the alkenyl group include vinyl, allyl, propenyl, isopropenyl, butenyl, isobutenyl, hexenyl, and cyclohexenyl groups. In particular, the vinyl group is preferred. In the general formula (1), k is typically 0 or a positive integer satisfying $0 \leq k \leq 10000$, preferably $5 \leq k \leq 2000$, and more preferably $10 \leq k \leq 1200$.

The component A1 may also include an organopolysiloxane having three or more, typically 3 to 30, and preferably about 3 to 20, silicon-bonded alkenyl groups per molecule. The alkenyl group has 2 to 8 carbon atoms, and particularly 2 to 6 carbon atoms and can be, e.g., a vinyl group or an allyl group. The molecular structure may be a linear, cyclic, branched, or three-dimensional network structure. The organopolysiloxane is preferably a linear organopolysiloxane in which the main chain is composed of repeating diorganosiloxane units, and both ends of the molecular chain are capped with triorganosiloxy groups. The viscosity of the linear organopolysiloxane may be 10 to 1000000 mPa·s, and particularly 100 to 100000 mPa·s at 25° C.

Each of the alkenyl groups may be bonded to any part of the molecule. For example, the alkenyl group may be bonded to either a silicon atom that is at the end of the molecular chain or a silicon atom that is not at the end (but in the middle) of the molecular chain. In particular, a linear organopolysiloxane represented by the following general formula (Chemical Formula 2) is preferred. The linear organopolysiloxane has 1 to 3 alkenyl groups on each of the silicon atoms at both ends of the molecular chain. In this case, however, if the total number of the alkenyl groups bonded to the silicon atoms at both ends of the molecular chain is less than 3, at least one alkenyl group is bonded to the silicon atom that is not at the end (but in the middle) of the molecular chain, e.g., as a substituent in the diorganosiloxane unit. As described above, the viscosity of the linear organopolysiloxane is preferably 10 to 1000000 mPa·s at 25° C. in terms of workability and curability. Moreover, the linear organopolysiloxane may include a small amount of branched structure (trifunctional siloxane units) in the molecular chain.

[Chemical Formula 2]

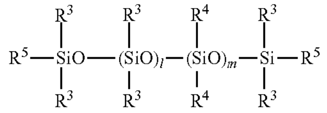

In the formula, $R^3$ represents substituted or unsubstituted monovalent hydrocarbon groups that are the same as or different from each other, and at least one of them is an alkenyl group. $R^4$ represents substituted or unsubstituted monovalent hydrocarbon groups that are the same as or different from each other and have no aliphatic unsaturated bond, $R^5$ represents alkenyl groups, and l and m represent 0 or a positive integer. The monovalent hydrocarbon group represented by $R^3$ has 1 to 10 carbon atoms, and particularly preferably 1 to 6 carbon atoms. Specific examples of the monovalent hydrocarbon group include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; alkenyl groups such as vinyl, allyl, propenyl, isopropenyl, butenyl, hexenyl, cyclohexenyl, and octenyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups.

The monovalent hydrocarbon group represented by $R^1$ has 1 to 10 carbon atoms, and particularly preferably 1 to 6 carbon atoms. Specific examples of the monovalent hydrocarbon group may be the same as those of $R^1$, but do not include an alkenyl group. The alkenyl group represented by $R^5$ has, e.g., 2 to 6 carbon atoms, and particularly preferably 2 to 3 carbon atoms. Specific examples of the alkenyl group may be the same as those of $R^2$ in the above formula (Chemical Formula 1), and the vinyl group is preferred. In the formula (Chemical Formula 2), 1 and m are typically 0 or positive integers satisfying $0<1+m\leq10000$, preferably $5\leq1+m\leq2000$, and more preferably $10\leq1+m\leq1200$. Moreover, 1 and m are integers satisfying $0<1/(1+m)\leq0.2$, and preferably $0.0011\leq1/(1+m)\leq0.1$.

(2) Crosslinking Component (Component A2)

The component A2 is an organohydrogenpolysiloxane that acts as a crosslinking agent. The addition reaction (hydrosilylation) between SiH groups in the component A2 and alkenyl groups in the component A1 produces a cured product. Any organohydrogenpolysiloxane that has two or more silicon-bonded hydrogen atoms (i.e., SiH groups) per molecule may be used. The molecular structure of the organohydrogenpolysiloxane may be a linear, cyclic, branched, or three-dimensional network structure. The number of silicon atoms in a molecule (i.e., the degree of polymerization) may be 2 to 1000, and particularly about 2 to 300.

The locations of the silicon atoms to which the hydrogen atoms are bonded are not particularly limited. The silicon atoms may be either at the ends or not at the ends (but in the middle) of the molecular chain. The organic groups bonded to the silicon atoms other than the hydrogen atoms may be, e.g., substituted or unsubstituted monovalent hydrocarbon groups that have no aliphatic unsaturated bond, which are the same as those of $R^1$ in the general formula (chemical formula 1).

The organohydrogenpolysiloxane of the component A2 may have the following structure.

[Chemical Formula 3]

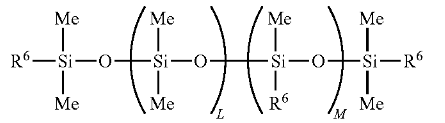

In the formula, $R^6$'s are the same as or different from each other and represent alkyl groups, phenyl groups, epoxy groups, acryloyl groups, methacryloyl groups, alkoxy groups, or hydrogen atoms, and at least two of $R^6$'s are hydrogen atoms. L represents an integer of 0 to 1000, and particularly 0 to 300, and M represents an integer of 1 to 200.

(3) Catalyst Component (Component C)

The catalyst component of the component C may be a catalyst used for a hydrosilylation reaction. Examples of the catalyst include platinum group metal catalysts such as platinum-based, palladium-based, and rhodium-based catalysts. The platinum-based catalysts include, e.g., platinum black, platinum chloride, chloroplatinic acid, a reaction product of chloroplatinic acid and monohydric alcohol, a complex of chloroplatinic acid and olefin or vinylsiloxane, and platinum bisacetoacetate.

(4) Thermally Conductive Particles (Component B)

The total amount of the thermally conductive particles of the component Bis preferably 1200 to 3400 parts by mass with respect to 100 parts by mass of the component A (matrix component). The addition of the thermally conductive particles can maintain a high thermal conductivity.

In the present invention, the thermally conductive particles may include three or more types of inorganic particles with different average particle sizes. This is because small-size inorganic particles fill the space between large-size inorganic particles so that the closest packing can be approximated to enhance the thermal conductive properties.

(5) Other Additives

The composition of the present invention may include components other than the above as needed. For example, a heat resistance improver (such as colcothar, titanium oxide, or cerium oxide), a flame retardant auxiliary, and a curing retarder may be added. Moreover, an organic or inorganic pigment may be added for the purpose of coloring and toning. The silane coupling agent as described above may also be added.

Hereinafter, the present invention will be described with reference to the drawings. In the following drawings, the same components are denoted by the same reference numerals. FIG. 1 is a schematic cross-sectional view illustrating a heat dissipation structure 10 that incorporates thermally conductive sheets in an embodiment of the present invention. A thermally conductive sheet 11*b* dissipates heat generated by an electronic component 13 such as a semiconductor device. The thermally conductive sheet 11*b* is fixed to a main surface 12*a* of a heat spreader 12 facing the electronic component 13, and placed between the electronic component 13 and the heat spreader 12. A thermally conductive sheet 11*a* is placed between the heat spreader 12 and a heat sink 15. The thermally conductive sheets 11*a*, 11*b* and the heat spreader 12 constitute a heat dissipation member that serves to dissipate heat from the electronic component 13. The heat spreader 12 is formed into, e.g., a rectangular plate shape and has the main surface 12*a* facing the electronic component 13 and side walls 12*b* along the perimeter of the main surface 12*a*. The thermally conductive sheet 11*b* is provided on the main surface 12*a* surrounded by the side walls 12*b* of the heat spreader 12. The heat sink 15 is provided, via the thermally conductive sheet 11*a*, on the other surface 12*c* of the heat spreader 12 that is opposite to the main surface 12*a*. The electronic component 13 is, e.g., a semiconductor device such as BGA and is mounted on a wiring board 14.

EXAMPLES

Hereinafter, the present invention will be described by way of examples. However, the present invention is not limited to the following examples. Various parameters were measured in the following manner.

<Thermal Conductivity>

Figure 2A:
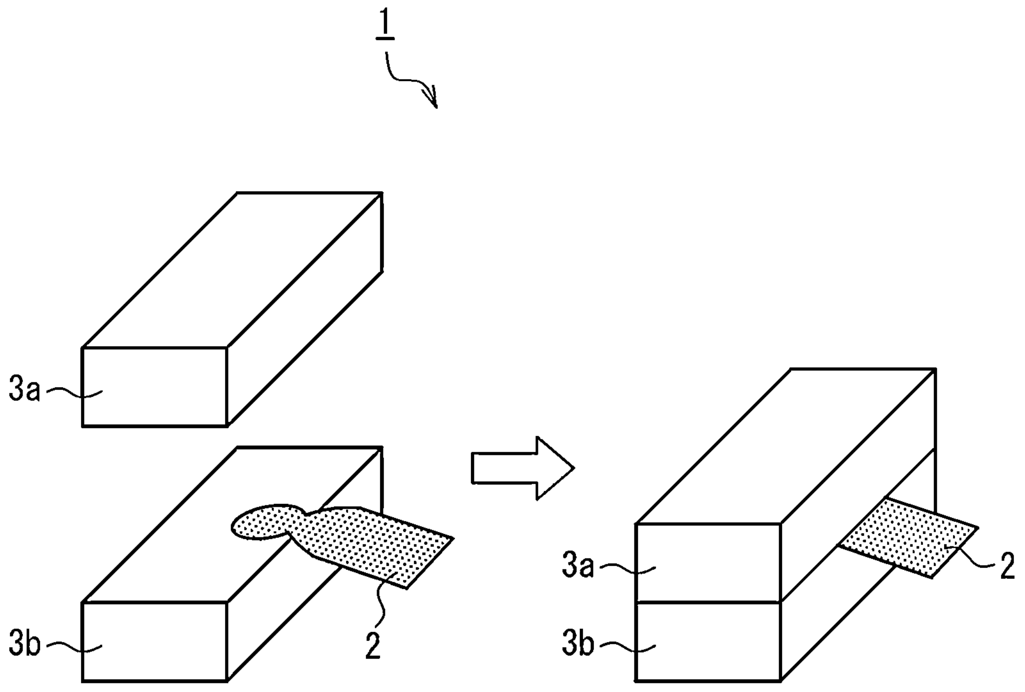
FIGS. 2A to 2B are schematic diagrams illustrating a method for measuring the thermal conductivity of a sample in an example of the present invention.
Figure 2B:
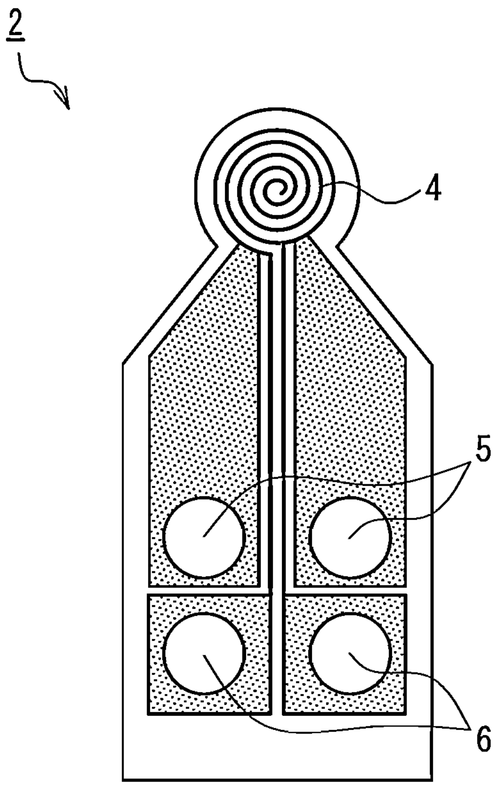

The thermal conductivity of a thermally conductive silicone rubber sheet was measured by a hot disk (in accordance with ISO/CD 22007-2). As shown in FIG. 2A, using a thermal conductivity measuring apparatus 1, a polyimide film sensor 2 was sandwiched between two samples 3*a*, 3*b*, and constant power was applied to the sensor 2 to generate a certain amount of heat. Then, the thermal characteristics were analyzed from the value of the temperature rise of the sensor 2. The sensor 2 has a tip 4 with a diameter of 7 mm. As shown in FIG. 2B, the tip 4 has a double spiral structure of electrodes. Moreover, an electrode 5 for an applied current and an electrode 6 for a resistance value (temperature measurement electrode) are located on the lower portion of the sensor 2. The thermal conductivity was calculated by the following formula (1).

$$\lambda = \frac{P_0 \cdot D(\tau)}{\pi^{3/2} \cdot r} \cdot \frac{D(\tau)}{\Delta T(\tau)} \quad \text{[Formula 1]}$$

λ: Thermal conductivity (W/m·K)
$P_0$-Constant power (W)
r: Radius of sensor (m)
τ: $\sqrt{\alpha \cdot t/r^2}$
α: Thermal diffusivity of sample ($m^2/s$)
t: Measuring time(s)
D(τ): Dimensionless function of t
ΔT(τ): Temperature rise of sensor (K)

<Hardness>

The hardness of the thermally conductive silicone rubber sheet was measured in accordance with ASKER C (ASTM D2240: 2021). For reference, SHORE 00 hardness (JIS K 7312:1996) was also measured.

<Degree of Plasticity>

The degree of plasticity was determined in accordance with JIS K 6300-3:2019 and ISO 2007:1991. Using a Wallace plastometer, a sample was compressed between two metal plates under a predetermined load (100 N) for a predetermined time (15 sec) at a measurement temperature of 23° C. The degree of plasticity ($P_0=t/t_0\times100$) was calculated by dividing the thickness (t) of the sample after the compression by the thickness ($t_0$) of the sample before the compression. The smaller the value $P_0$, the more flexible the sample. The degree of plasticity before vacuum defoaming was measured when the compound was produced. The degree of plasticity after vacuum defoaming was measured after the compound was produced and then defoamed under a reduced pressure of −0.1 Pa for 5 minutes. The degree of plasticity after vacuum defoaming is important because the compound is molded into a sheet after defoaming.

Examples 1 to 10, Comparative Examples 1 to 4

1. Material Components (1) Polyorganosiloxane (Component A)

A commercially available two-part room temperature curing silicone polymer (silicone component) containing a polyorganosiloxane was used. One solution (solution A) contained a base polymer component (component A1 of component A) and a platinum group metal catalyst. The other solution (solution B) contained a base polymer component (component A1 of component A) and an organohydrogenpolysiloxane as a crosslinking agent (component A2 of component A).

(2) Thermally Conductive Particles (Component B)

The thermally conductive particles shown in Tables 1 and 2 were used. The average particle size is D50 (median diameter) in a volume-based cumulative particle size distribution measured by a laser diffraction scattering method. The method may use, e.g., a laser diffraction/scattering particle size distribution analyzer LA-950 S2 manufactured by HORIBA, Ltd. In Tables 1 and 2, each value before the unit μm indicates the average particle size of the thermally conductive particles, and AlN is an abbreviation for aluminum nitride.

(3) Platinum Group Metal Catalyst (Component C)

A platinum-vinyldisiloxane complex was used as an additional platinum group metal catalyst. As described above, the two-part room temperature curing silicone polymer (silicone component) contained the platinum group metal catalyst. During the preparation of the silicone composition in each example, the additional platinum group metal catalyst was added in an amount of 2 parts by mass (2 g) with respect to 100 parts by mass (100 g) of the silicone component so that the polyorganosiloxane was fully subjected to primary curing.

2. Compound

The amount of each material shown in Tables 1 and 2 was weighed, and then the materials were mixed in a mixer to form a compound. Tables 1 and 2 show the amount of each material (parts by mass) with respect to 100 parts by mass (100 g) of the silicone component (i.e., the two-part room temperature curing silicone polymer). The compound was defoamed under a reduced pressure of −0.1 Pa for 5 minutes.

3. Sheet Molding Process

The defoamed compound was sandwiched between polyethylene terephthalate (PET) films, which had been subjected to a release treatment, and then was rolled and molded into a sheet with a thickness of 2.0 mm by using even-speed rolls. Subsequently, the sheet-like compound was heated at 100° C. for 15 minutes and cured to form a thermally conductive silicone rubber sheet. Tables 1 and 2 show the conditions and the results.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Matrix | Base polymer: A1 (g) | 50 | 50 | 50 | 50 | 50 | 50 | 50 |
| | Base polymer: A2 (g) | 50 | 50 | 50 | 50 | 50 | 50 | 50 |
| Additive | Decyltrimethoxysilane (g) | — | — | 2 | 2 | 2 | 2 | 2 |
| Catalyst | Platinum catalyst (g) | 2 | 2 | 2 | 2 | 2 | 2 | 2 |
| Thermally conductive particles | (a) Spherical alumina 108 μm (g) | 1200 | 1000 | 1200 | 1400 | 900 | 600 | 1000 |
| | (b) Spherical alumina 0.3 μm (g) | — | — | — | — | — | — | — |
| | (b) Irregularly-shaped alumina 0.2 μm (g) | — | — | — | — | — | — | — |
| | (b) Irregularly-shaped alumina 0.3 μm (g) | 280 | 150 | 280 | 280 | 280 | 280 | 350 |
| | (c) Irregularly-shaped AlN 1 μm (g) | 250 | 300 | 300 | 300 | 300 | — | — |
| | Irregularly-shaped alumina 2 μm (g) | — | 200 | — | — | — | 400 | 200 |
| | (c) Irregularly-shaped AlN 5 μm (g) | 100 | — | — | — | — | — | — |
| | (c) Irregularly-shaped AlN 15 μm (g) | — | — | — | — | — | — | — |

TABLE 1-continued

| | | Ex. 1 | Ex. 2 | Ex. 3 | Ex. 4 | Ex. 5 | Ex. 6 | Ex. 7 |
|---|---|---|---|---|---|---|---|---|
| | (c) Irregularly-shaped AlN 20 μm (g) | 450 | 500 | 600 | 600 | 600 | 600 | 500 |
| | Spherical alumina 80 μm (g) | — | — | — | — | — | — | — |
| | (c) Irregularly-shaped AlN 80 μm (g) | — | — | — | — | — | — | 100 |
| | (c) Irregularly-shaped AlN 108 μm (g) | — | — | — | — | 300 | 400 | 100 |
| Results | Thermal conductivity (W/mk) [hot disk] | 9.6 | 8.8 | 9.7 | 10.5 | 11 | 9.7 | 8.6 |
| | Hardness [ASKER C] | 19 | 30 | 32 | 35 | 37 | 31 | 31 |
| | Hardness [SHORE 00] | 33 | 50 | 52 | 60 | 59 | 55 | 56 |
| | Degree of plasticity before vacuum defoaming | 27.5 | 32.6 | 33.8 | 42.2 | 52.9 | 49.5 | 43.5 |
| | Degree of plasticity after vacuum defoaming | 27.5 | 35.5 | 34.8 | 51.9 | 57.5 | 61.1 | 44.9 |

TABLE 2

| | | Ex. 8 | Ex. 9 | Ex. 10 | Comp. Ex. 1 | Comp. Ex. 2 | Comp. Ex. 3 | Comp. Ex. 4 |
|---|---|---|---|---|---|---|---|---|
| Matrix | Base polymer: A1 (g) | 50 | 50 | 50 | 50 | 50 | 50 | 50 |
| | Base polymer: A2 (g) | 50 | 50 | 50 | 50 | 50 | 50 | 50 |
| Additive | Decyltrimethoxysilane (g) | 2 | 2 | 2 | 2 | 2 | 2 | — |
| Catalyst | Platinum catalyst (g) | 2 | 2 | 2 | 2 | 2 | 2 | 2 |
| Thermally conductive particles | (a) Spherical alumina 108 μm (g) | 1200 | 1300 | 1300 | — | 550 | 1000 | — |
| | (b) Spherical alumina 0.3 μm (g) | — | — | 150 | — | — | — | — |
| | (b) Irregularly-shaped alumina 0.2 μm (g) | — | 150 | — | — | — | — | — |
| | (b) Irregularly-shaped alumina 0.3 μm (g) | 280 | — | — | 280 | 280 | 480 | 350 |
| | (c) Irregularly-shaped AlN 1 μm (g) | 300 | 450 | 400 | 300 | 300 | 300 | — |
| | Irregularly-shaped alumina 2 μm (g) | — | — | — | — | — | — | 400 |
| | (c) Irregularly-shaped AlN 5 μm (g) | — | — | — | — | — | — | — |
| | (c) Irregularly-shaped AlN 15 μm (g) | 600 | 500 | 500 | — | — | — | 400 |
| | (c) Irregularly-shaped AlN 20 μm (g) | — | — | — | 600 | 600 | 600 | — |
| | Spherical alumina 80 μm (g) | — | — | — | 1200 | 550 | — | 1000 |
| | (c) Irregularly-shaped AlN 80 μm (g) | — | — | — | — | — | — | — |
| | (c) Irregularly-shaped AlN 108 μm (g) | — | — | — | — | 200 | — | — |
| Results | Thermal conductivity (W/mk) [hot disk] | 9.8 | 9.6 | 8.9 | 10 | 11.2 | 9.6 | 8.3 |
| | Hardness [ASKER C] | 34 | 36 | 49 | 55 | 53 | 61 | 38 |
| | Hardness [SHORE 00] | 60 | 60 | 70 | 73 | 70 | 75 | 61 |
| | Degree of plasticity before vacuum defoaming | 48 | 36.4 | 51.3 | 72.1 | 87.8 | 62.2 | 66.2 |
| | Degree of plasticity after vacuum defoaming | 52.1 | 40.6 | 52.2 | 93.6 | 96.7 | 84 | 96.1 |

In the Examples, the results confirmed that the thermal conductivity was high and the degree of plasticity of each of the compositions after defoaming was low. This is because the Examples met the requirements that the thermally conductive particles included (a) 600 to 1500 parts by mass of spherical alumina with an average particle size of more than 100 μm, (b) 100 to 400 parts by mass of alumina with an average particle size of 1 μm or less, and (c) 500 to 1500 parts by mass of aluminum nitride with an average particle size of 0.8 to 150 μm with respect to 100 parts by mass of the matrix resin (silicone rubber).

In the Comparative Examples, the results showed that the degree of plasticity of each of the compositions after defoaming was unfavorable. The reason for this is as follows: the component (a) was not used in Comparative Example 1; the component (a) was used, but added in a small amount in Comparative Example 2; the amount of the component (b) was large in Comparative Example 3; and the component (a) was not used and the amount of the component (c) was small in Comparative Example 4.

INDUSTRIAL APPLICABILITY

The thermally conductive composition and the thermally conductive sheet of the present invention are suitable to be interposed between a heat generating member and a heat dissipator of electrical and electronic components or the like.

DESCRIPTION OF REFERENCE NUMERALS

1 Thermal conductivity measuring apparatus
2 Sensor
3*a*, 3*b* Sample
4 Tip of the sensor
5 Electrode for applied current
6 Electrode for resistance value (temperature measurement electrode)
10 Heat dissipation structure
11*a*, 11*b* Thermally conductive sheet
12 Heat spreader
13 Electronic component
14 Wiring board
15 Heat sink

The invention claimed is:

1. A thermally conductive composition comprising a matrix resin made of a thermosetting resin, a curing catalyst, and thermally conductive particles, wherein the thermally conductive particles include the following (a) to (c) with respect to 100 parts by mass of the matrix resin:

(a) 600 to 1500 parts by mass of spherical alumina with an average particle size of more than 100 μm;

(b) 100 to 400 parts by mass of alumina with an average particle size of 1 μm or less; and (c) 500 to 1500 parts by mass of aluminum nitride with an average particle size of 0.8 to 150 μm, and wherein a degree of plasticity of the thermally conductive composition after defoaming and before curing is 80 or less.

2. The thermally conductive composition according to claim 1, wherein the degree of plasticity of the thermally conductive composition after defoaming and before curing is 70 or less.

3. The thermally conductive composition according to claim 1, wherein a cured product of the thermally conductive composition has a thermal conductivity of 7.3 W/m·K or more.

4. The thermally conductive composition according to claim 1, wherein the cured product of the thermally conductive composition has an ASKER C hardness of 50 or less.

5. The thermally conductive composition according to claim 1, wherein the matrix resin is at least one selected from the group consisting of an addition curable silicone polymer, a peroxide curable silicone polymer, and a condensation silicone polymer.

6. The thermally conductive composition according to claim 1, wherein a silane coupling agent is further added in an amount of 0.1 to 10 parts by mass with respect to 100 parts by mass of the matrix resin component.

7. The thermally conductive composition according to claim 1, wherein the aluminum nitride (c) is in the form of irregularly-shaped crushed particles.

8. A thermally conductive sheet comprising a thermally conductive composition comprising a matrix resin made of a thermosetting resin, a curing catalyst, and thermally conductive particles, wherein the thermally conductive particles include the following (a) to (c) with respect to 100 parts by mass of the matrix resin:

(a) 600 to 1500 parts by mass of spherical alumina with an average particle size of more than 100 μm;

(b) 100 to 400 parts by mass of alumina with an average particle size of 1 μm or less; and (c) 500 to 1500 parts by mass of aluminum nitride with an average particle size of 0.8 to 150 μm, wherein a degree of plasticity of the thermally conductive composition after defoaming and before curing is 80 or less, and wherein the thermally conductive composition has been molded into a sheet.

9. The thermally conductive sheet according to claim 8, having a thickness of 0.2 to 10 mm.

* * * * *